US010511944B2

(12) United States Patent
Lazar et al.

(10) Patent No.: US 10,511,944 B2
(45) Date of Patent: Dec. 17, 2019

(54) PROACTIVE AND REACTIVE MANAGEMENT FOR DEVICES IN A NETWORK

(71) Applicant: T-Mobile USA, Inc., Bellevue, WA (US)

(72) Inventors: Dragos Lazar, Issaquah, WA (US); Leon Chung-Dai Yen, Issaquah, WA (US); Omar Hassan, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/298,735

(22) Filed: Mar. 11, 2019

(65) Prior Publication Data
US 2019/0208389 A1 Jul. 4, 2019

Related U.S. Application Data

(62) Division of application No. 15/618,057, filed on Jun. 8, 2017, now Pat. No. 10,231,104.

(51) Int. Cl.
*H04M 11/04* (2006.01)
*H04W 4/50* (2018.01)
(Continued)

(52) U.S. Cl.
CPC .......... *H04W 4/50* (2018.02); *H04L 41/0803* (2013.01); *H04L 41/0813* (2013.01); *H04L 41/0836* (2013.01); *H04L 43/0817* (2013.01); *H04L 65/1016* (2013.01); *H04M 1/24* (2013.01); *H04W 4/12* (2013.01); *H04W 4/70* (2018.02); *H04W 4/90* (2018.02); *H04W 8/20* (2013.01); *H04W 24/08* (2013.01); *H04M 1/72519* (2013.01); *H04M 1/72522* (2013.01); *H04W 4/02* (2013.01); *H04W 4/14* (2013.01); *H04W 4/80* (2018.02)

(58) Field of Classification Search
CPC .......... H04W 4/50; H04W 4/70; H04W 4/90; H04W 4/12; H04W 8/20; H04W 24/08; H04W 8/40; H04W 4/24; H04W 4/14; H04L 41/0803; H04L 41/0813; H04L 41/0836; H04L 43/0817; H04L 65/1016; H04M 1/24; H04M 1/72519; H04M 1/72522
USPC .......................... 455/404.2, 550.1, 406, 418
See application file for complete search history.

(56) References Cited

U.S. PATENT DOCUMENTS 7,552,365 B1 6/2009 Marsh et al.
8,340,711 B1 * 12/2012 Glass ...................... H04W 4/90
455/552.1

(Continued)

*Primary Examiner* — Danh C Le
(74) *Attorney, Agent, or Firm* — Perkins Coie LLP

(57) ABSTRACT

The disclosed technology includes a health engine that monitors and modifies customer-premises equipment (CPE) devices. The health engine can detect patterns in CPE device behavior, identify problems with CPE devices, and adjust CPE device configurations proactively or reactively to address problems or prevent problems. In some implementations, the health engine can instruct a CPE device or gateway to restart, update its software or firmware, notify a user of the CPE device of an unhealthy behavior pattern in a CPE device. The health engine can modify a CPE device prior to a user using the device or when the CPE device is inactive.

13 Claims, 6 Drawing Sheets

(51) Int. Cl.

| | |
|---|---|
| *H04W 24/08* | (2009.01) |
| *H04W 4/12* | (2009.01) |
| *H04W 4/90* | (2018.01) |
| *H04W 4/70* | (2018.01) |
| *H04L 12/24* | (2006.01) |
| *H04L 12/26* | (2006.01) |
| *H04M 1/24* | (2006.01) |
| *H04L 29/06* | (2006.01) |
| *H04W 8/20* | (2009.01) |
| *H04M 1/725* | (2006.01) |
| *H04W 4/02* | (2018.01) |
| *H04W 4/14* | (2009.01) |
| *H04W 4/80* | (2018.01) |

(56) References Cited

U.S. PATENT DOCUMENTS

| | | | |
|---|---|---|---|
| 9,262,771 B1* | 2/2016 | Patel | G06Q 20/325 |
| 9,734,690 B2 | 8/2017 | Haflinger et al. | |
| 10,231,104 B2 | 3/2019 | Lazar et al. | |
| 2009/0089070 A1* | 4/2009 | Engel | G06Q 50/265 |
| | | | 705/342 |
| 2010/0027467 A1* | 2/2010 | Wu | H04W 48/18 |
| | | | 370/328 |
| 2010/0253504 A1 | 10/2010 | Lliteras et al. | |
| 2013/0120131 A1* | 5/2013 | Hicks, III | H04L 69/14 |
| | | | 340/501 |
| 2013/0244609 A1* | 9/2013 | Velusamy | H04W 4/90 |
| | | | 455/404.1 |
| 2014/0016643 A1* | 1/2014 | Vasseur | H04L 45/7453 |
| | | | 370/392 |
| 2014/0116634 A1* | 5/2014 | Godard | D21H 17/57 |
| | | | 162/137 |
| 2014/0129942 A1 | 5/2014 | Rathod | |
| 2014/0327540 A1 | 11/2014 | Shin et al. | |
| 2014/0368601 A1* | 12/2014 | deCharms | H04W 4/021 |
| | | | 348/14.02 |
| 2016/0307427 A1 | 10/2016 | Haflinger et al. | |
| 2016/0309026 A1* | 10/2016 | Sterman | H04M 3/5116 |
| 2017/0005515 A1 | 1/2017 | Sanders et al. | |
| 2017/0132059 A1 | 5/2017 | Virmani | |
| 2017/0172424 A1* | 6/2017 | Eggers | A61B 5/0205 |
| 2017/0251347 A1* | 8/2017 | Mehta | H04W 4/90 |
| 2018/0007083 A1 | 1/2018 | Small et al. | |

* cited by examiner

PROACTIVE AND REACTIVE MANAGEMENT FOR DEVICES IN A NETWORK

CROSS REFERENCE TO RELATED APPLICATIONS

This application is a division of U.S. patent application Ser. No. 15/618,057 filed on Jun. 8, 2017, entitled PROACTIVE AND REACTIVE MANAGEMENT FOR DEVICES IN A NETWORK, now U.S. Pat. No. 10,231,104, which is hereby incorporated by reference in its entirety.

BACKGROUND

Customer-premises equipment (CPE) is an electronic device located at a customer's premises that itself connects to a network or enables other devices to connect to a network. CPE devices include mobile phones, telephones, routers, switches, residential gateways (RGs), set-top boxes (STBs), fixed mobile convergence devices, home networking adapters, Internet access gateways, and home Internet of Things (IoT) solutions that include centralized hub and connected smart peripherals (e.g. doorbell, security camera, sensor, home appliance, etc.). CPE devices couple to networks (e.g wide area networks (WANs), the Internet, etc. to thereby enable consumers to access services; CPE devices can distribute those services in a home via a local area network (LAN) or Wireless LAN (WLAN). Customers use CPE devices for various operations, including connecting to the Internet, communicating with a network or a device, placing or receiving phone calls, email, hosting Voice over Internet Protocol (VoIP) calls, and other telecommunications services.

Network providers have elected to use Technical Report 069 ("TR-069") as a protocol to monitor and manage CPE devices. As a bidirectional Simple Object Access Protocol (SOAP)/Hypertext Transfer Protocol (HTTP)-based protocol, TR-069 provides communication between CPE devices and servers for management and modification of CPE devices. Network providers implement TR-069 in a wide range of telecommunications technology, including digital subscriber line (DSL), cable and Ethernet RGs, optical network terminals (ONTs), IP television STBs, network attached storage (NAS), powerline adapters, femtocells, microcells, picocells, and IP phones. The Broadband Forum manages the TR-069 standard and reports that the number of devices implementing TR-069 exceeds 350 million. More information regarding TR-069 is found at https://www-.broadband-forum.org/standards-and-software/technical-specifications/tr-069-files-tools, which is incorporated by reference for its entirety.

Although TR-069 is widely implemented to manage CPE devices, the TR-069 standard and implementing equipment have several shortcomings that affect consumers, network providers, and service providers. For example, service or network providers that use the TR-069 standard require a call center to handle customer calls where TR-069 has identified a failing or problematic device. The network provider hosting the call center takes considerable time and value away from the provider and customer when CPE devices fail. Also, most subscribers find fixing a device that operates under TR-069 challenging, as a CPE device interface (e.g., an RG's interface) is complex. For example, a user generally cannot access a CPE device's configuration settings necessary to fix a TR-069 issue from the user interface.

Moreover, if subscriber access to a CPE device interface is permitted, there is a likelihood that the subscriber will improperly change configuration settings, resulting in CPE device failure, poor performance, or subscriber frustration. The eventual outcome is a call to customer support, which takes away valuable time and resources for all parties involved. Additionally, service providers and network providers waste millions of dollars per year on call centers and operations to fix devices operating on the TR-069 standard. Accordingly, the industry needs technology to address the above-mentioned problems and potentially provide additional benefits.

BRIEF DESCRIPTION OF THE DRAWINGS

The following drawings illustrate some implementations of the disclosed technology.

Figure 1:
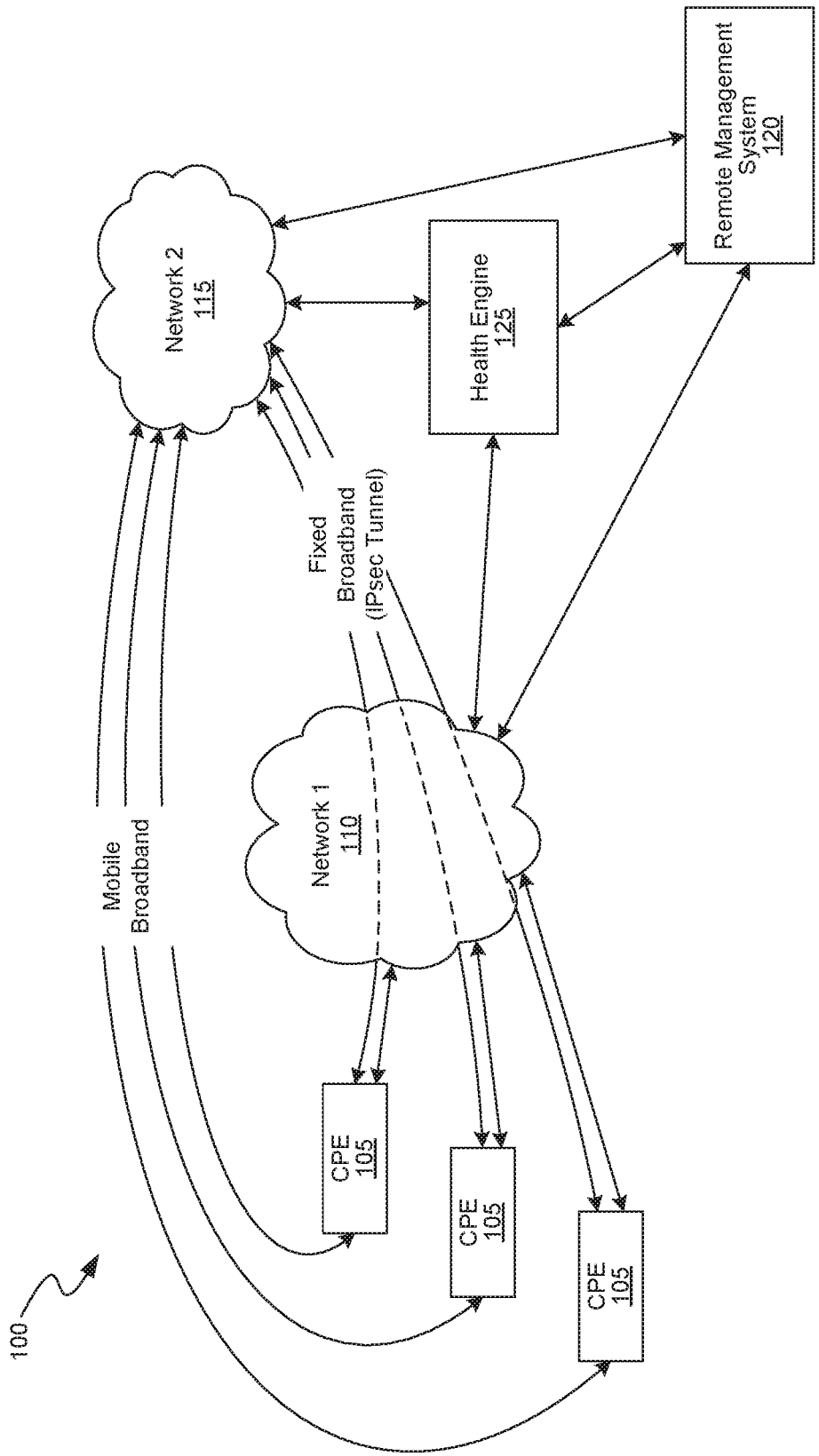
FIG. 1 illustrates a CPE environment in accordance with some implementations of the disclosed technology.

The drawings are not drawn to scale. Also, some components or operations can be separated into different blocks or combined into a single block for the purposes of discussion of some of the implementations of the disclosed technology. The disclosed technology is intended to cover modifications, equivalents, and alternatives falling within the scope of the disclosed technology. For example, memory storing instructions can be located on a device or located in a remote location relative to the device. Also, a processor can execute instructions stored in a memory locally or read instructions from a remote memory.

DETAILED DESCRIPTION

The disclosed technology includes a health engine that monitors and modifies CPE devices. The health engine can detect patterns in CPE device behavior, identify problems or potential problems with CPE devices, and adjust CPE device configuration proactively or reactively to address problems or potential problems. For example, the health engine can determine that a person frequently uses a smartphone to initiate VoIP calls on weekdays between 9:00 and 11:00 a.m. Prior to 9:00 a.m. on weekdays, the health engine can determine the smartphone is not working due to a software error and, based on this determination, the health engine can instruct the smartphone to install updated software prior to the user initiating a VoIP call. Alternatively, the health engine can cause the smartphone to restart prior to 9:00 am. In some implementations, the health engine modifies CPE devices automatically before a user is aware of an issue or potential issue. The health engine is a combination of specialized hardware and software that can communicate with CPE devices over a network and is described in more detail in FIG. 3.

The health engine can enable a CPE device to comply with E911 emergency standards in accordance with the Third Generation Partnership Project (3GPP). For example, 3GPP defines requirements for mobile devices setting up emergency sessions on an IP Multimedia Subsystem (IMS) network. One requirement for setting up emergency sessions is determining the address or geolocation where a call is initiated such that an E911 operator can determine the location of a user. The health engine can determine that a CPE device is attempting or previously attempted to set up an IMS session to place a call or access the Internet by pulling information from the IMS network. The health engine also can determine that the IMS network or IP network handling the phone call cannot determine the CPE device's physical address and, in response, the health engine can query a customer database to determine the user's billing address. The health engine can ask the user if the user's billing address is the user's physical location through text message, email, or voice call. Alternatively, the health engine can receive an alternative address from the user through user input to determine an actual location of the CPE device.

In some implementations, the health engine has benefits related to improving computer and network technology. For example, the health engine reduces calls to call centers by actively and remotely resolving device- and network-related issues. By reducing calls to call centers, service and network providers reduce costs of operating networks, and customers are more satisfied with the quality of service. Additionally, the health engine reduces load on monitoring servers and IMS networks used in implementing the TR-069 standard because the amount of traffic that relates to errors is reduced.

FIG. 1 illustrates a CPE environment in accordance with some implementations of the disclosed technology. The CPE environment 100 includes CPE devices 105, network 110, network 115, remote management system 120, and health engine 125. In some implementations, the CPE environment 100 includes a home, office, residential area, commercial area, or any combination of these environments. Although the CPE environment 100 illustrates only CPE devices, the CPE environment 100 can also include Internet of Things (IoT) devices. IoT devices include desktops and laptop computers, smartphones, tablets, wearables, appliances, automobiles, and other devices that can connect to a network. Manufacturers may prefer to add the TR-069 standard to IoT networks to increase security and monitoring of IoT devices.

The CPE devices 105 provide services and functions for users and include mobile phones, telephones, routers, switches, RGs, STBs, fixed mobile convergence products, home networking adapters, IoT devices, and access points. The CPE devices 105 enable consumers to access services and distribute those services in a home or elsewhere via a LAN, WLAN, personal area network (PAN), etc. In some implementations, customers use the CPE devices 105 to connect to the Internet, access databases, communicate with a network or another device, place or receive phone calls, and host VoIP calls.

The network 110 and the network 115 enable CPE devices and other devices in the CPE environment 100 to communicate and connect with other devices. The networks 110 and 115 can include a LAN, Wireless LAN (WLAN), a Wide Area Network (WAN), Global System for Mobile Communications (GSM), Bluetooth, WiFi, Fixed Wireless Data, 2G, 2.5G, 3G, 4G, 5G, and LTE networks, using messaging protocols such as TCP/IP, Short Message Service (SMS), multimedia messaging service (MMS), or any other wireless data networks or messaging services. The networks 110 and 115 can also include wired networks.

In some implementations, the network 110 is the Internet, and the network 115 is an IMS network. For example, network 110 can be a WLAN network set up by a customer or service provider, and the network 115 is an IMS network. The IMS network can implement Session Initiation Protocol (SIP)-based communication. More information regarding IMS can be found at http://www.3gpp.org/technologies/keywords-acronyms/, which is incorporated herein for its entity. The IMS network can include at least a Proxy Call Session Control Server (P-CSCF); a Serving CSCF (S-CSCF); an Interrogating CSCF (I-CSCF), and other network elements such as Breakout Gateway Control Function (BGCF), Media Gateway Control Function (MGCF), and Signaling Gateway (SGW). The IMS network is connected to a Home Subscriber Server (HSS) and the public switched telephone network (PSTN).

In some implementations, the network 110 is referred to as the "signaling network" because it governs paging, signaling, and monitoring of the CPE device according to the TR-069 standard. In some implementations, the network 115 is referred to as "service network" because it provides a service or services (e.g., VoIP or email) for the CPE device. The CPE 105 may connect to network 115 in two different ways. As seen on FIG. 1, CPE 105 can directly reach network 115 with mobile broadband (e.g. LTE), or through the Internet with fixed broadband (e.g. cable) utilizing IPsec tunnels. In implementations where the network 110 is a signaling network and the network 115 is the service network, network providers can keep signaling and monitoring bandwidth on the network 110 and keep service bandwidth on the network 115. Decreasing bandwidth usage on a service network can improve a customer's experience with the service when using the CPE device.

The remote management system 120 is a vendor-agnostic system that manages and monitors the CPE devices 105. The remote management system 120 can use protocols such as TR-069, Simple Network Management Protocol (SNMP), SOAP, HTTP/HTTPS, and Open Mobile Alliance (OMA) Device Management (DM). The remote management system 120 is described in more detail in FIG. 2, but as a general overview, the remote management system 120 can generate ACS reports related to the operation of the CPE devices 105 and send instructions to the CPE devices 105. The instructions can include updating software, updating firmware, a command to restart the device, or other TR-069 commands. In some implementations, the remote management system 120 communicates with the health engine 125 to improve the health of the CPE devices 105.

As shown by the bold double-headed arrows in FIG. 1, the remote management system 120 communicates with the health engine 125 (e.g., using Extensible Messaging and Presence Protocol (XMPP)). The remote management system 120 and health engine 125 communicate with each other. The health engine 125 collects CPE data/reports directly from the remote management system utilizing an integrated listener routine with either a pull or push mechanism. The health engine 125 could send instructions either directly with XMPP, or through ACS, to the CPE devices. The health engine can detect patterns in CPE device behavior, identify problems with CPE devices, identify healthy or unhealthy conditions, and adjust CPE device configuration proactively or reactively to address the error or unhealthy condition. A problem is defined as a CPE device error or service error. Examples of errors can be found in Table 1 below. An unhealthy condition is defined as an abnormal condition compared to a normal dataset. For example, if a CPE device is usually active between 9 to 11 a.m. on weekdays, and then the CPE is inactive from 9 to 11 a.m., the CPE device is unhealthy and the health engine can analyze the CPE device as described in FIG. 3 and FIG. 4.

Continuing with FIG. 1, if the network 115 is an IMS network, the health engine can communicate with the IMS network to receive data related to CPE devices using services on the IMS network or connecting to the IMS network. For example, the health engine 125 can invoke an application program interface (API) to pull data from the IMS network. The API can pull data related to IMS sessions, call failure, call success, call duration, data throughput for session, amount of data used by devices, and applications accessed or used on the IMS network. The API can be written in Java™ or C/C++/C#. In some implementations, the API is a representational state transfer (REST) service to a Web 2.0 application. The health engine 125 can analyze the data (e.g., CPE profile data, CPE device behavior data, IMS data) and use it to instruct the remote management system 120 pulled from the network. The health engine 125 is described in more detail in FIG. 3.

In some implementations, the health engine 125 automatically addresses an error or unhealthy condition. By automatically addressing an error or unhealthy condition, the health engine 125 reduces the number of calls to call centers and improves a customer's experience with the CPE device, network provider, and service provider.

Figure 2:
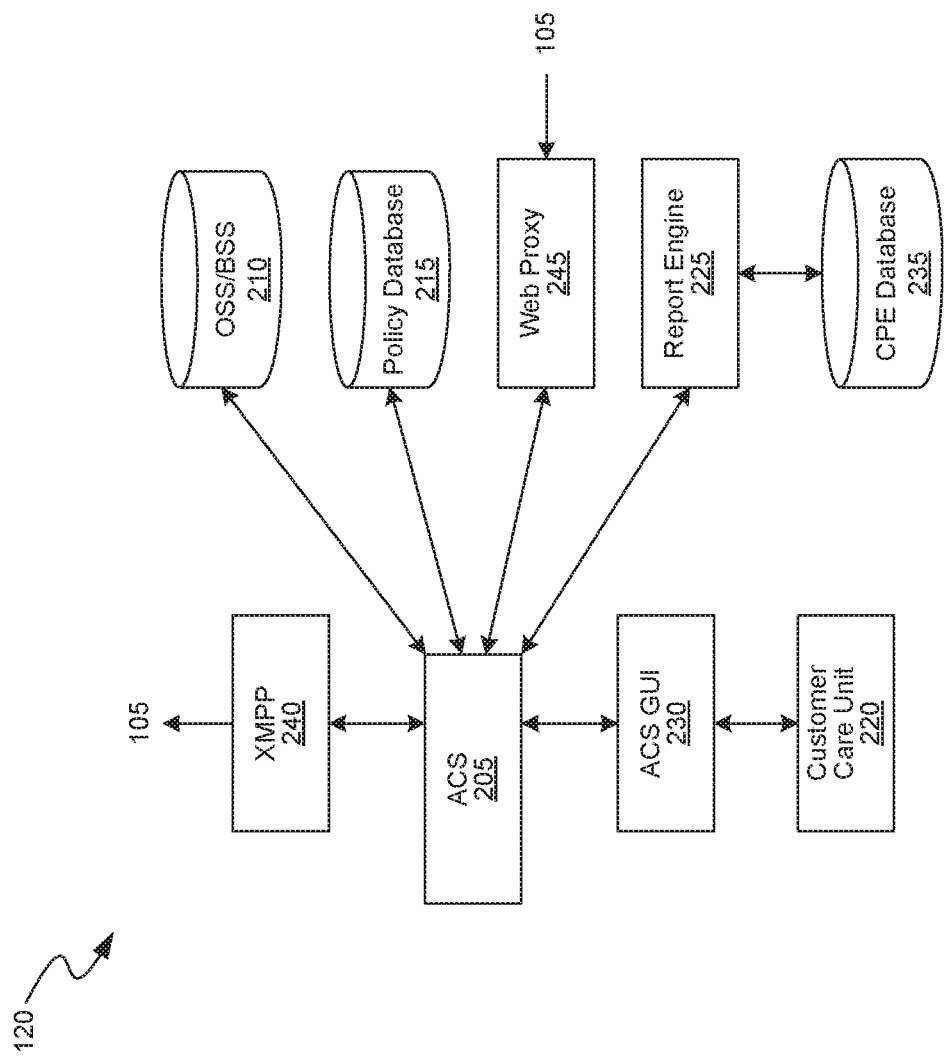
FIG. 2 illustrates a more detailed overview of the remote management system in FIG. 1 in accordance with some implementations of the disclosed technology.

FIG. 2 illustrates a more detailed overview of the remote management system 120 shown in FIG. 1. FIG. 2 includes an auto configuration server (ACS) 205, an Operations Support System (OSS)/Business Support System (BSS) 210, a policy database 215, a customer care unit 220, a report engine 225, and an ACS graphical user interface (GUI) 230. The remote management system 120 implements CPE management functions within a common framework such as the TR-069. Each of the components of the remote management system 120 is described in more detail below. In some implementations, the remote management system 120 includes is a combination of hardware and software including a CPU and memory device.

The ACS 205 is a server that sets up, manages, modifies, and monitors CPE devices. In some implementations, the ACS 205 implements the TR-069 standard to centrally manage CPE devices in a network or networks. The ACS 205 can configure CPE devices, register CPE accidents, register failure or events associated with CPE devices, set up or register new CPE devices, and monitor CPE devices. Although the ACS 205 is illustrated as a single server in FIG. 2, the ACS 205 can also be a distributed computing system encompassing multiple servers located at the same or at geographically disparate physical locations.

The OSS/BSS 210 provides a network operator the ability to perform accounting, business operations (e.g., billing), and network maintenance for the service provider for a network. In some implementations, the OSS/BSS 210 also enables a network operator to define the billing parameters, rate plans and associated logic, and customer schemes.

The policy database 215 enables CPE policy management and enforcement. The policy database 215 includes data related to timing aspects of the remote management system 120 such as the time interval during which the CPE must notify the ACS, search for updates, report data parameters (e.g., Quality of Service (QoS)), bytes sent/received, applications used or previously used, user updates, blocking settings, and security settings restricting users from changing specific parameter values. In some implementations, a technician can update the policy database 215 remotely.

The report engine 225 generates ACS reports. The ACS reports can include log and configuration data from the CPE devices 105. In some implementations, ACS reports include policy diagnostics, stores diagnostics information, authentication flow diagnostics, passed authentications, failed authentications, authentication summary, session status summary, security information, and session history.

The ACS GUI 230 allows technicians to review data associated with the remote management system 120. As seen in revised FIG. 1, customer care unit 220 utilizes ACS GUI 230 to retrieve CPE data from CPE Database 235 through ACS 205. In some implementations, the ACS GUI 230 includes a computer and screen where a technician can review information associated with the system. In some implementations, a technician can use the ACS GUI 230 to configure log files, server certificates, ACS server settings, policies, access, and security settings. As shown in FIG. 2, a customer care unit 220 utilizes the ACS GUI 230 to retrieve CPE status. The remote monitoring system 120 may also include the following components: a CPE database 235 that stores data reported by each CPE; an XMPP server 240, where the ACS 205 and the health engine 125 both utilize the XMPP server 240 to send instructions to CPE 105; and a web proxy 245 that operates as an intermediary server to redirect incoming traffic from CPE devices.

Figure 3:
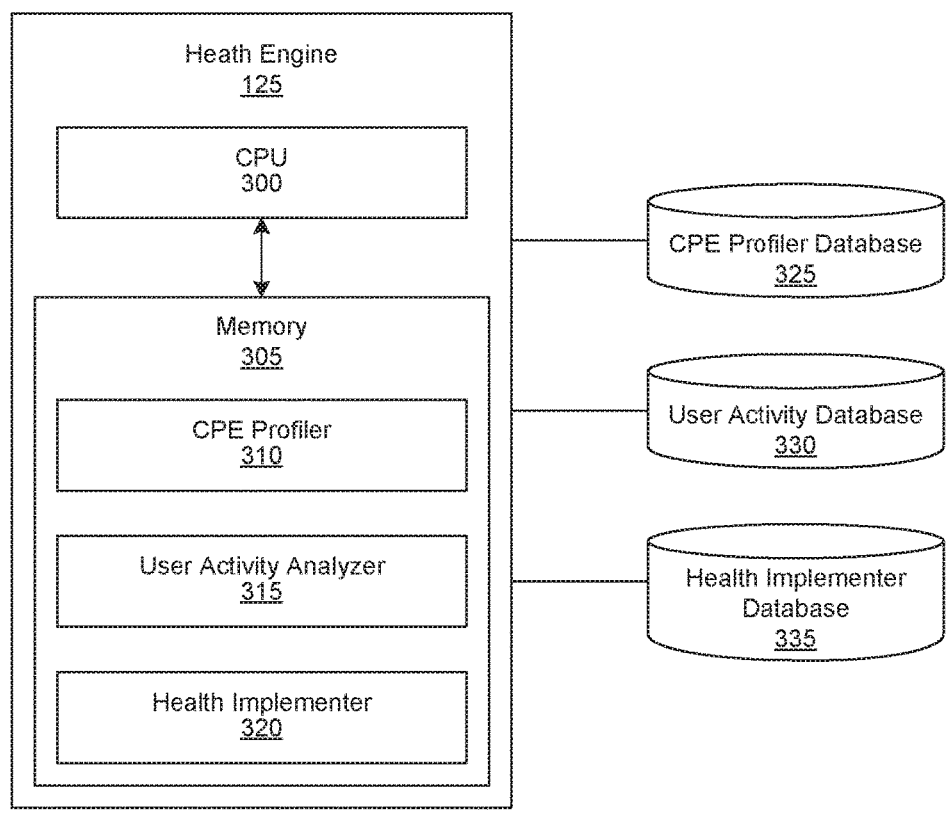
FIG. 3 illustrates a more detailed overview of the health engine of FIG. 1 in more detail in accordance with some implementations of the disclosed technology.

FIG. 3 is a block diagram illustrating exemplary elements of the health engine 125. The health engine can detect patterns in CPE device behavior, identify problems or potential problems with CPE devices, and adjust CPE device configuration proactively or reactively to address problems or potential problems.

The health engine 125 includes central processing unit (CPU) 300 and a memory 305 storing a CPE profiler 310 that is associated with CPE profiler database 325, a user activity analyzer 315 that is associated with user activity database 330, and a health implementer 320 and associated health implementer database 335. These hardware and software components communicate to perform operations of the health engine. The CPU 300 can be a single processing unit or multiple processing units in a device or distributed across multiple devices. The CPU 300 can be physically or electronically coupled to other hardware devices, for example, with the use of a bus, such as a peripheral component interconnect or small computer interface bus. In some implementations, the CPU 300 can include an application-specific integrated circuit (ASIC) designed to run programs stored in memory 305.

The memory 305 includes one or more of various hardware devices for volatile and non-volatile storage and can include both read-only and writable memory. For example, a memory can comprise random access memory (RAM), CPU registers, read-only memory (ROM), and writable non-volatile memory, such as flash memory, hard drives, CDs, DVDs, magnetic storage devices, tape drives, and device buffers. The memory is not a propagating signal divorced from underlying hardware; rather, a memory is non-transitory. The memory 305 can be physically coupled to the CPU 300 or the CPU 300 can communicate with the memory using data bus, network, cloud service, wireless, or wired connection. Each of the components of the health engine 125 included in the memory 305 are described in more detail below.

The CPE profiler 310 profiles CPE devices. In some implementations, the CPE profiler 310 determines hardware and software characteristics of a device. For example, the CPE profiler 310 determines firmware, firmware version, software version, and specifications of a device. The CPE profiler 310 can determine characteristics about a device by querying the device directly, or the CPE profiler 310 can receive serial number information and look up the specifications of the device. The CPE profiler 310 can also determine when a device was restarted, the frequency of restarts, and when the device was last updated. The CPE profiler 310 can store and access data in the CPE profiler database 325.

The user activity analyzer 315 collects and analyzes CPE device activity. CPE device activity can include session information, types of applications currently or previously used by a CPE device, CPE device bandwidth usage, security settings, number of calls placed, duration of time spent using the CPE device, time spent using a particular application or function on the CPE device, data used per unit of time (e.g., hour, minute, week, day), CPE device power health (e.g., battery health), frequency of restarting the CPE device, or other statistical data for the CPE device.

In some implementations, the user activity analyzer 315 uses a clustering algorithm to determine whether a CPE device is healthy or unhealthy. A health CPE device is operating normally and an unhealthy device is operating abnormally compared to a normal operating dataset associated with the CPE device. To determine whether a CPE device is healthy or unhealthy, the user activity analyzer 315 can use a cluster algorithm includes grouping a set of objects (e.g., CPE device activity data) into groups (called a cluster) that are more similar (in some sense or another) to each other than to those in other clusters. Clusters include groups with small distances among the cluster members, dense areas of the data space, intervals, or particular statistical distributions. Some example clusters are the duration and time a user is using a CPE device. For example, the user activity analyzer 315 can collect CPE usage data over a two-week period. Based on this data, the user activity analyzer 315 can determine that a CPE device is mostly likely active and healthy between 9:00-11:00 a.m. and 5:00-8:00 p.m. because the user is able to use applications on the CPE device. A technician can adjust clusters or parameters for clusters to modify the definition of healthy of unhealthy behavior.

In addition to the clustering algorithm, the user activity analyzer 315 can implement unsupervised anomaly detection algorithms. The algorithms detect anomalies set under an assumption that the majority of the instances in the data set are normal and look for instances that seem to fit least to the remainder of the data set. For example, the user activity analyzer 315 can determine that a smartphone is experiencing calling issues because for weeks, it placed calls every day, but for the last few days, it has not and the smartphone is likely experiencing an anomaly. The user activity analyzer 315 can store and access information in the user activity database 330.

Continuing with FIG. 3, the health implementer 320 can resolve CPE device issues. In some implementations, the health implementer 320 sends a request to a malfunctioning CPE device to restart. In some implementations, the health implementer 320 causes a CPE device to update its software or firmware. The health implementer 320 can also receive feedback from a CPE device that recently received a proposed solution (e.g., restart) and determine if the CPE device is operating properly. The health implementer 320 can communicate with CPE devices through the ACS 205 or receive ACS reports from the report engine 225. The health implementer at least partially makes its decision to resolve a CPE device issue based on the user activity analyzer 315. Some examples of errors and associated corrective actions are described below. In some implementations, the health engine automatically implements an associated response action based on receiving or detecting an error in the CPE device.

TABLE 1

Example Errors and Associated Response Actions

| Example Error | Example Actions |
| --- | --- |
| E-911 address error | Query customer care database for user address or bill address; send a request to user to confirm user or billing address is address for CPE device (e.g., text message, email, notification to confirm address, phone call); receive confirmation of billing address for CPE device and update CPE device address. |
| SIM card error | Determine Subscriber Identify Module (SIM) card is unregistered on network; send instructions to network operator to register SIM card or, if network operator unavailable, attempt to register SIM card again and notify user if unsuccessful. |
| | Send notification to user that an incorrect SIM card is installed in the CPE device; request that user provide a shipping address for new SIM card or provide user with location of technical support to fix or replace SIM card. |
| | Determine the user has installed a multi-SIM card, send instructions to device to switch Mobile Subscriber Integrated Services Digital Network Number (MSISDN) number based on user location and user database lookup. |
| IMS server or network error | Determine user attempted to send a message too large for an IMS server because the message is above a policy message size limit; send instructions to CPE device to segment or parse the message into multiple messages. |
| | Determine a CPE device is experiencing an increasing number of errors because aspects of an SIP session such as requested media, bandwidth, or addressing style are not acceptable; send instructions to the CPE device to restart device or restart session when device is not in use. |
| Drop call error or frequent call dropping | Determine CPE device has more dropped calls than a previous time period; send instructions to the device to restart and/or run diagnostic on call feature when the user is not or is unlikely to be using the |

TABLE 1-continued

Example Errors and Associated Response Actions

| Example Error | Example Actions |
| --- | --- |
| | device.<br>Determine CPE device frequently has dropped calls; send instructions to CPE device to perform factory reboot; email user of the CPE device regarding factory reboot. |
| Temperature warning or fan failure | Determine that a CPE device has exceeded its recommended temperature once or several times; send instructions to a neighbor CPE device to handle load of the failing CPE device; send instructions to shut down or idle failing CPE device; and send instructions to a technician to replace or fix failing fan or move location of CPE device to a cooler area or room. |
| Unhealthy condition | Determine device is experiencing an unhealthy condition (e.g., not calling at usually times based on a clustering algorithm), and send a restart or reboot command to the CPE device. |

In addition to reacting to CPE device errors or unhealthy conditions, the health engine can proactively act. Proactively acting means the health engine 125 has determined an expected behavior of a CPE device based on, e.g., a clustering algorithm, and then, the health engine 125 sends a command to test whether the device is prepared to function properly for during an upcoming period. For example, if the health engine 125 determines a CPE device is usually active between the periods of 9 to 11 a.m. on weekdays to place VoIP calls, the health engine 125 can send instructions to test the VoIP application for a CPE device at 8:55 a.m. every week day. If the test fails, the health engine 125 can send a restart or reboot command to the CPE device. In some implementations, the health engine 125 can determine that a CPE device generally sends more than 15 MB of email between 8 a.m. to 3 p.m. on weekdays based on a clustering algorithm. In these implementations, the health engine 125 can test whether email service is working properly at 7:30 am. Also, if the health engine 125 determines that the CPE device failed to send more than 15 MB of email on a weekday, the health engine 125 can query the CPE to determine if an error occurred or it can query the user to ask if the email is functioning properly.

Figure 6:
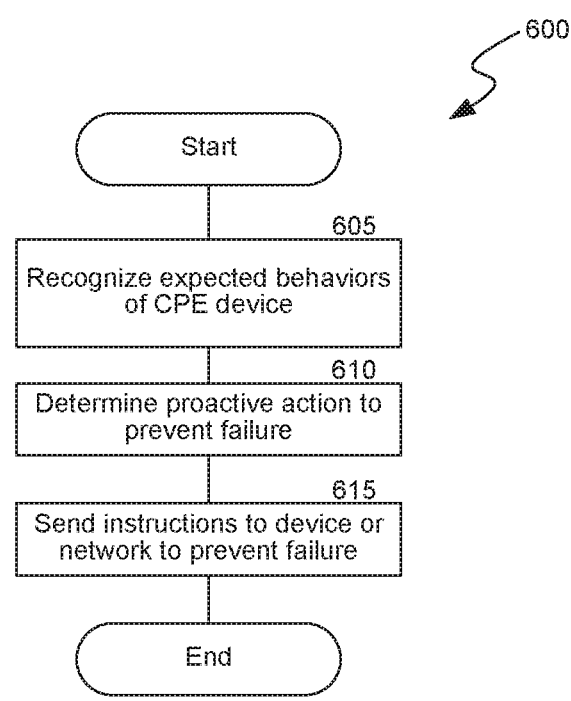
FIG. 6 is a flowchart illustrating a set of operations for proactively correcting CPE device behavior.

FIG. 6 more generally describes this operation. Beginning in block 605, the health engine 125 recognizes expected behaviors of CPE devices, and can determine whether a device may soon fail or otherwise encounter a problem. In block 610, the health engine determines one or more proactive measures to prevent the failure or other problem. In block 615, the health engine sends instructions to the device or to the network to prevent such failure or problem from occurring.

Although FIG. 3 illustrates that memory 305 includes the CPE profiler 310, the user activity analyzer 320, and the health implementer 325, these components also can be stored in separate memories. For example, the CPE profiler 310 can have its own processor and be stored in a separate server device with respect to the health implementer 320.

Also, although the ACS 205 monitors and manages the CPE devices 105, the health engine 125 can offload monitoring and managing responsibilities from the ACS 205. For example, the health engine 125 can analyze the ACS reports and then determine appropriate solutions to fixing errors or improving (e.g., optimizing) the perform of CPE devices.

Figure 4:
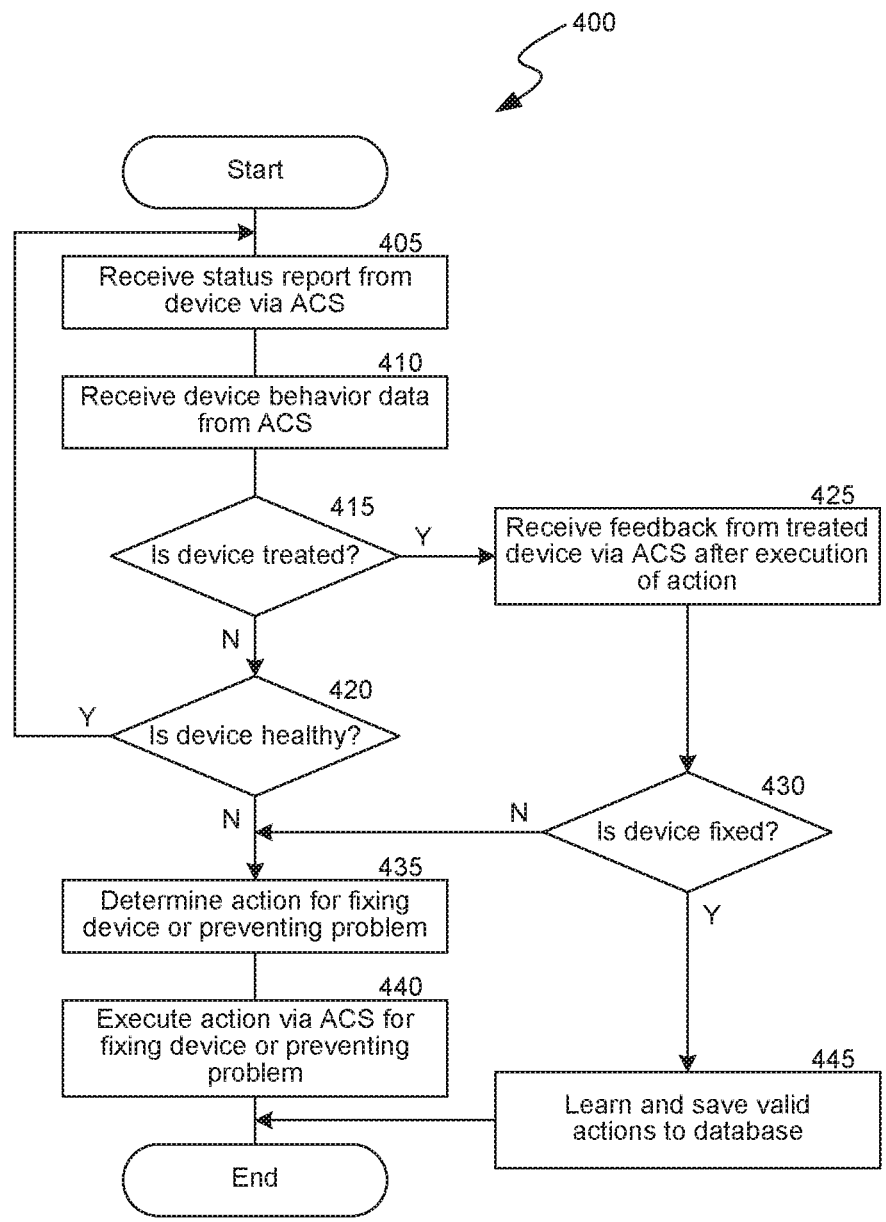
FIG. 4 is a flowchart illustrating a set of operations for managing a CPE device in accordance with some implementations of the disclosed technology.

FIG. 4 is a flowchart illustrating a set of operations for managing a CPE, also referred to as process 400. The process 400 includes receiving information about the operation and activity of a CPE device and using this information to improve the operation of the device and the user's experience. In some implementations, the health engine 125 (FIG. 3) initiates the process 400 automatically once a CPE device is registered. In other implementations, a network technician can initiate the process 400 for single or multiple CPE devices by accessing the health engine 125 through the ACS GUI 230 (FIG. 2).

At receiving operation 400, the health engine 125 receives a status report from a remote management system 120 (FIG. 1). The status report generally includes information about the operation of the device such as firmware, hardware, latest uploads and downloads of software, error reports, requests, time stamps, and other information common in the TR-069 standard. In some implementations, a technician can adjust the ACS report to include or not include particular device information based on policy or goals of the server or network provider.

In some implementations, the health engine 125 pulls the status report from an ACS server, and in other implementations the ACS server periodically, or whenever a change to the current status (e.g. registration error, dropped call, etc.) occurs, sends the status report to the health engine. The health engine 125 can receive status reports with various frequency. In some implementations, the health engine receives a status report for a CPE device every 15 minutes. A network technician can adjust the frequency of ACS reporting based on network bandwidth, demands of the network, and CPE device type (e.g., devices with a low or high failure rate).

At detecting operation 410, the health engine 125 detects behavior of the CPE device. Behavior of the CPE device can include hours of operation (e.g., when the CPE device is active, inactive, how long it was unregistered for), applications used by the device currently or previously, quality of service during operation, data related to performance metrics (e.g., download or upload speed and amount of data), frequency of errors, security information, and other information the CPE device is enabled to store and transmit. The health engine stores the device activity in a CPE device database such as the user activity database 330 (FIG. 3).

In some implementations, the health engine 125 stores the CPE device behavior and it analyzes the stored data. For example, the health engine can store CPE device operation status (e.g., active or inactive) on a weekly or monthly basis. The health engine can implement a clustering algorithm to determine periods when the device is mostly likely to be active or least likely to be active. The health engine can also determine the most frequently used applications or services for the CPE device. In some implementations, the health engine 125 associates periods of user activity with the most frequently used applications. The health engine 125 can use these datasets to define periods of normal use or abnormal use.

At decision operation 415, the health engine analyzes CPE device behavior data from the ACS 205 to determine if the device has been treated. If so, in block 425 the health monitoring device receives feedback from the treated device, via ASC, following execution of an action. At block 425, the health engine 125 can receive feedback from a CPE after the execution of the action. In some implementations, the health engine 125 uses the feedback to determine if the executed action was partially or completely effective in fixing the problem. For example, the health engine 125 can determine if the device is unhealthy or healthy after the execution operation. Additionally, the health engine 125 can send the feedback to a network provider if the health engine 125 determines that a CPE device or a group of CPE devices fails to operate properly even after several attempted fixes or solutions. The network provider can develop a new fix or solution, and then upload this fix into the health engine 125 if similar problems arise again for another CPE device.

If the device has not been treated, then at decision operation 420 the health engine 125 determines whether a CPE device is healthy. If the health engine 125 determines that a CPE device is healthy, the process 400 returns to the receiving operation 405, where it receives another status report from the CPE device. Otherwise if the CPE device is determined to be unhealthy, or if the device has not been fixed at decision operation 430, then the health engine 125 determines the appropriate actions to fix device or prevent failure. In some implementations, a technician can include a waiting period between decision operation 420 and starting process 400 again. If the device is determined to be fixed at decision operation 430, then the health engine 125 will label the executed action as valid and update the Health Implementer Database 335 at learning operation 445.

To determine whether a CPE device is healthy, the health engine 125 analyzes the behavior of the CPE device and the status report. If the status report includes errors, the health engine 125 can communicate with a remote management system 120 (FIG. 2) to determine an action for fixing device (see determining operation 435).

At determining operation 435, the health engine 125 determines an action for fixing the CPE device. In some implementations, the health engine 125 determines the action by querying an error and associated action for resolving the issue. Examples of errors and associated actions can be found in Table 1. At execution operation 440, the health engine 125 executes a resolution action. In some implementations, the health engine sends instructions to the CPE device, where the instructions cause the CPE device to restart or update its software.

Although the health engine 125 performs process 400 in implementations described above, other devices can perform process 400. For example, the remote management system 120 (FIG. 2) can perform process 400 by receiving instructions from the health engine 125.

Figure 5:
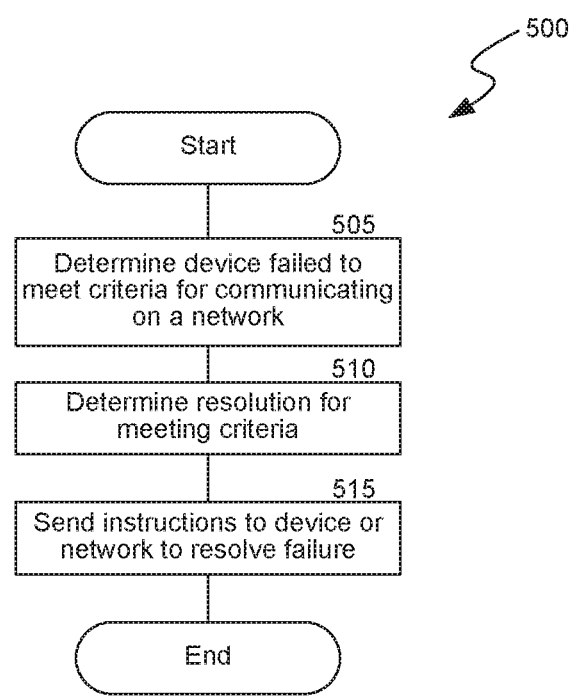
FIG. 5 is flowchart illustrating a set of operations for resolving an issue with a CPE device in accordance with some implementations of the disclosed technology.

FIG. 5 is flowchart illustrating a set of operations for resolving an issue with a CPE device, also referred to as process 500. Process 500 includes determining a CPE device has failed to meet criteria for properly operating on a network and addressing this failed criteria. In some implementations, the health engine 125 (FIG. 3) performs operation 500 when it receives a notification from an IMS network that a CPE device is not set up for E-911 sessions because the CPE device lacks an address or geolocation. The health engine 125 can initiate process 500, or an IMS network can send a request to the health engine 125 to start the process. For example, the health engine 125 can implement process 500 after a user installs a VoIP device on a CPE device.

At determining operation 505, the health engine 125 determines a CPE has failed to meet network criteria or failed to set up a session. For example, the health engine 125 can receive a notification from an IMS network that a CPE device cannot start an E911 emergency session because the CPE device does not have an associated address or geolocation. At determining operation 510, the health engine 125 determines how to fix the failed criteria. For example, the health engine 125 can determine from a lookup table that the system can look up a billing address associated with a user of the CPE device and use this address as the address or geolocation for the device.

At sending operation 515, the health engine 125 sends instructions to a device or network to resolve the failure. For example, the health engine 125 can send instructions to OSS/BSS or customer care unit to look up a user's address, and then send this address to the user to verify it is indeed the location of the CPE device. In some implementations, the health engine 125 sends an SMS message, a MMS message, or email message to the CPE device or user of the CPE device to confirm a billing address. Alternatively, the health engine 125 can query a user to input a new billing address or address associated with the location of the CPE device.

Although the health engine 125 can end process 500 after the sending operation 515, the health engine 125 can perform process 500 again. For example, if the health engine 125 determines that the CPE device has moved permanently (e.g., a user moved his/her residential location, a business moved its geographic location, or a CPE device's IP address has changed along with a different ISP location), the health engine 125 can repeat the process 500 for the CPE device. The health engine 125 can determine a CPE device has moved based on receiving an indication from the network provider that the CPE device has been deactivated for a long time or from the billing system (e.g., a user changed his/her address).

Although the health engine 125 performs process 500 in implementations described above, other devices can perform process 500. For example, the remote management system 120 (FIG. 2) can perform process 500 by receiving instructions from the health engine 125.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," "physically coupled," "electronically coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Special-purpose hardware (e.g., circuitry), as programmable circuitry appropriately programmed with software and/or firmware or as a combination of special-purpose and programmable circuitry, can perform the operations of this disclosed technology. Some implementations include a non-transitory computer readable medium storing instructions, which can be used to program a computer (or other electronic devices) to perform a process. The non-transitory computer readable can include optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the disclosed technology and may be included in more than one implementation. In addition, such phrases do not necessarily refer to the same implementations or different implementations.

The above Detailed Description of examples of the disclosed technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the disclosed technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method for managing emergency services for a customer-premises equipment (CPE) device, the method comprising:
    receiving an error notification from an IP Multimedia Subsystem (IMS) network regarding a configuration of a CPE device,
        wherein the error notification indicates that the CPE device lacks an address for emergency telecommunication session services;
    querying a customer database that includes CPE device registration information and billing address information associated with the CPE device,
        wherein the querying occurs in response to receiving the error notification;
    identifying a billing address associated with the CPE device;
    sending a request to a user of the CPE device to confirm whether the identified billing address is an address to associate with emergency session services;
    receiving a response to the request confirming that the address is the address to associate with emergency services; and
    sending a configuration setting to the IMS network to update the address for emergency sessions to the identified address.

2. The method of claim 1, further comprising:
    determining that querying results in a null result; and
    sending a notification of this null result to a network operator.

3. The method of claim 1, wherein the method complies with a Technical Report 069 (TR-069) standard and an E-911 standard for IMS networks, and wherein at least a portion of the IMS network is owned or managed by a cellular network service provider.

4. The method of claim 1, wherein sending the request to the CPE device further comprises:
    sending a Short Message Service (SMS) message, multimedia messaging service (MMS) message, or email message to the CPE device or user of the CPE device, or receiving an SMS, MMS or email message from the CPE device or user and then providing a respond based on the received SMS, MMS or email message from the CPE device or user.

5. The method of claim 1, further comprising:
monitoring behavior for the CPE device, wherein the monitoring includes determining when the CPE is active and inactive using a clustering algorithm; and
sending the configuration setting to the IMS network during a predicted inactive period.

6. The method of claim 1, further comprising:
receiving an indication that the CPE device has changed location permanently, wherein receiving the indication includes querying a CPE profile database; and
in response to the notification, querying a user of the CPE device for an update location.

7. The method of claim 1, further comprising:
receiving, via an application program interface (API), network activity associated with the CPE device communicating with an IP Multimedia Subsystem (IMS) network; and
wherein the method is exclusively performed on a signaling network, and wherein the CPE device has access to the signaling network and at least one other network.

8. At least one non-transitory, computer-readable medium, carrying instructions, which when executed by at least one data processor, performs operations for managing emergency services for a user device, the operations comprising:
receiving an error notification from an IP Multimedia Subsystem (IMS) network regarding a configuration of a user device,
wherein the error notification indicates that the user device lacks an address for emergency session services;
querying a customer database that includes user device registration information and billing address information associated with the user device,
wherein the querying occurs in response to receiving the error notification;
identifying a billing address associated with the user device;
sending a request to a user of the user device regarding whether the identified billing address is an address to associate with emergency session services;
receiving a response to the request that the address is the address to associate with emergency services; and
providing a configuration setting to the IMS network to update the address for emergency sessions to the identified address.

9. The computer-readable medium of claim 8, further comprising:
determining that querying results in a null result; and
sending a notification of this null result to a network operator.

10. The computer-readable medium of claim 8, wherein the method complies with a Technical Report 069 (TR-069) standard and an E-911 standard for IMS networks, and wherein at least a portion of the IMS network is owned or managed by a cellular network service provider.

11. The computer-readable medium of claim 8, wherein sending the request to the user device further comprises:
sending a Short Message Service (SMS) message, multimedia messaging service (MMS) message, or email message to the user device or user of the user device, or receiving an SMS, MMS or email message from the user device or user and then providing a respond based on the received SMS, MMS or email message from the user device or user.

12. The computer-readable medium of claim 8, further comprising:
monitoring behavior for the user device, wherein the monitoring includes determining when the user is active and inactive using a clustering algorithm; and
providing the configuration setting to the IMS network during a predicted inactive period.

13. The computer-readable medium of claim 8, further comprising:
receiving an indication that the user device has changed location permanently, wherein receiving the indication includes querying a user profile database; and
in response to the notification, querying a user of the user device for an update location.

* * * * *